(12) United States Patent
Lee et al.

(10) Patent No.: US 10,550,255 B2
(45) Date of Patent: Feb. 4, 2020

(54) POLYOLEFINE RESIN COMPOSITION, POLYOLEFINE MASTER BATCH, METHOD OF MANUFACTURING POLYOLEFINE MASTER BATCH, AND ARTICLE FORMED OF THE SAME

(71) Applicants: Hyundai Motor Company, Seoul (KR); Kia Motors Corporation, Seoul (KR)

(72) Inventors: Hanki Lee, Hwaseong-si (KR); Hak Soo Kim, Gyeonggi-do (KR); Hyeong Shin Lee, Daejeon (KR); Hyun Jin Kim, Daejeon (KR); Byung Kook Nam, Daejeon (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 26 days.

(21) Appl. No.: 15/619,720

(22) Filed: Jun. 12, 2017

(65) Prior Publication Data
US 2018/0134885 A1    May 17, 2018

(30) Foreign Application Priority Data

Nov. 17, 2016  (KR) .................. 10-2016-0153224

(51) Int. Cl.
*C08L 23/00*     (2006.01)
*C08L 23/16*     (2006.01)
*C08K 5/00*      (2006.01)
*C08L 23/06*     (2006.01)
*C08L 23/12*     (2006.01)
*C08L 27/12*     (2006.01)
*C08K 3/013*     (2018.01)

(52) U.S. Cl.
CPC .............. *C08L 23/16* (2013.01); *C08K 5/005* (2013.01); *C08K 5/0016* (2013.01); *C08L 23/06* (2013.01); *C08L 23/12* (2013.01); *C08L 27/12* (2013.01); *C08K 3/013* (2018.01)

(58) Field of Classification Search
CPC .......... C08L 33/04; C08L 33/08; C08L 33/10; C08L 33/14; C08L 23/16; C08L 23/06; C08L 23/12; C08L 23/00; C08L 2205/00; C08L 2205/02; C08L 2310/00; C08K 3/34
See application file for complete search history.

(56) References Cited

U.S. PATENT DOCUMENTS 8,481,636 B2 *   7/2013  Kim ................... C08L 23/10
                                                524/433
9,115,278 B2 *   8/2015  Kim ........................ C08K 3/34

FOREIGN PATENT DOCUMENTS

KR   10-2005-0093186 A    9/2005
KR   10-2012-0028537 A    3/2012
KR      1020100090445  *  5/2012  .............. C08L 23/12

* cited by examiner

*Primary Examiner* — Rip A Lee
(74) *Attorney, Agent, or Firm* — Slater Matsil, LLP

(57) ABSTRACT

According to an aspect of the present disclosure, a polyolefine resin composition includes 1 to 20 parts by weight of one polyolefine resin having a first melt index; 1 to 20 parts by weight of another polyolefine resin having a second melt index different from the first melt index; 60 to 85 parts by weight of an inorganic filler; and 5 to 20 parts by weight of a fluorine-acrylic copolymer-based compound.

18 Claims, 3 Drawing Sheets

POLYOLEFINE RESIN COMPOSITION, POLYOLEFINE MASTER BATCH, METHOD OF MANUFACTURING POLYOLEFINE MASTER BATCH, AND ARTICLE FORMED OF THE SAME

CROSS-REFERENCE TO RELATED APPLICATIONS

This application claims the benefit of Korean Patent Application No. 10-2016-0153224, filed on Nov. 17, 2016 in the Korean Intellectual Property Office, the disclosure of which is incorporated herein by reference.

TECHNICAL FIELD

Embodiments of the present disclosure relate to a polyolefin polyolefin resin composition having scratch resistance, a polyolefin master batch, a method of preparing the polyolefin master batch, and an article formed of the polyolefin master batch.

BACKGROUND

Owing to excellent molding efficiency, high impact resistance, excellent chemical resistance, low specific gravity, and low manufacturing costs, polyolefin composite materials have been widely used to manufacture automotive interior and exterior parts requiring safety and superior functionality such as bumpers, instrument panels, door trim panels, and interior trims.

Although conventional polyolefin composite materials have excellent mechanical properties such as rigidity and impact resistance, surface scratches may easily occur due to relatively lower mechanical properties than metals and concrete. Thus, it is difficult to apply the conventional polyolefin composite materials to industrial fields without having a surface coating.

SUMMARY

Therefore, in one aspect the present disclosure provides a polyolefin resin composition including a polyolefin resin, an inorganic filler, and a fluorine-acrylic copolymer-based compound, a polyolefin master batch, a method of preparing the polyolefin master batch, and an article formed of the polyolefin master batch.

Additional aspects of the disclosure will be set forth in part in the description which follows and, in part, will be obvious from the description, or may be learned by practice of the disclosure.

According to an aspect of the present invention, a polyolefin resin composition comprise 1 to 20 parts by weight of one polyolefin resin having a first melt index; 1 to 20 parts by weight of another polyolefin resin having a second melt index different from the first melt index; 60 to 85 parts by weight of an inorganic filler; and 5 to 20 parts by weight of a fluorine-acrylic copolymer-based compound.

The first melt index may be from 0.5 to 10 g/10 min, and the second melt index may be from 60 to 200 g/10 min.

The polyolefin resin may comprise at least one of a random copolymer resin prepared by polymerizing one monomer selected from the group consisting of propylene, ethylene, butylene, and octene, a block copolymer resin prepared by blending polypropylene with ethylene-propylene rubber, and a copolymer resin of polyethylene, ethylene vinyl acetate, and a-olefin, and a homopolypropylene resin.

The inorganic filler may comprise at least one selected from the group consisting of talc, calcium carbonate, magnesium oxide, calcium stearate, wollastonite, mica, silica, calcium silicate, clay, and carbon black.

The fluorine-acrylic copolymer-based compound may have a number average molecular weight of 50,000 to 100,000.

The polyolefin resin composition may further comprise at least one additive selected from the group consisting of an antioxidant, a UV stabilizer, a flame retardant, a colorant, a plasticizer, a thermal stabilizer, a slip agent, a compatibilizer, and an antistatic agent.

According to another aspect of the present invention, a polyolefin master batch prepared by melt-extruding a polyolefin resin composition comprise 1 to 20 parts by weight of one polyolefin resin having a first melt index, 1 to 20 parts by weight of another polyolefin resin having a second melt index different from the first melt index, 60 to 85 parts by weight of an inorganic filler, and 5 to 20 parts by weight of a fluorine-acrylic copolymer-based compound.

The first melt index may be from 0.5 to 10 g/10 min, and the second melt index may be from 60 to 200 g/10 min.

According to another aspect of the present invention, there is provided a method of preparing a polyolefin master batch. The method comprise melt-extruding a polyolefin resin composition comprising 1 to 20 parts by weight of one polyolefin resin having a first melt index, 1 to 20 parts by weight of another polyolefin resin having a second melt index different from the first melt index, 60 to 85 parts by weight of an inorganic filler, and 5 to 20 parts by weight of a fluorine-acrylic copolymer-based compound.

The first melt index may be from 0.5 to 10 g/10 min, and the second melt index may be from 60 to 200 g/10 min.

The method may further comprise mixing the polyolefin resin composition with at least one additive selected from the group consisting of an antioxidant, a UV stabilizer, a flame retardant, a colorant, a plasticizer, a thermal stabilizer, a slip agent, a compatibilizer, and an antistatic agent.

According to another aspect of the present invention, there is provided an article formed of a polyolefin composite material composition.

The polyolefin composite material composition comprise a polyolefin master batch formed of a polyolefin resin composition comprising 1 to 20 parts by weight of one polyolefin resin having a first melt index, 1 to 20 parts by weight of another polyolefin resin having a second melt index different from the first melt index, 60 to 85 parts by weight of an inorganic filler, and 5 to 20 parts by weight of a fluorine-acrylic copolymer-based compound; and another polyolefin resin.

The article may comprise an automotive part having scratch resistance.

The first melt index may be from 0.5 to 10 g/10 min, and the second melt index may be from 60 to 200 g/10 min.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION OF ILLUSTRATIVE EMBODIMENTS

Figure 1:
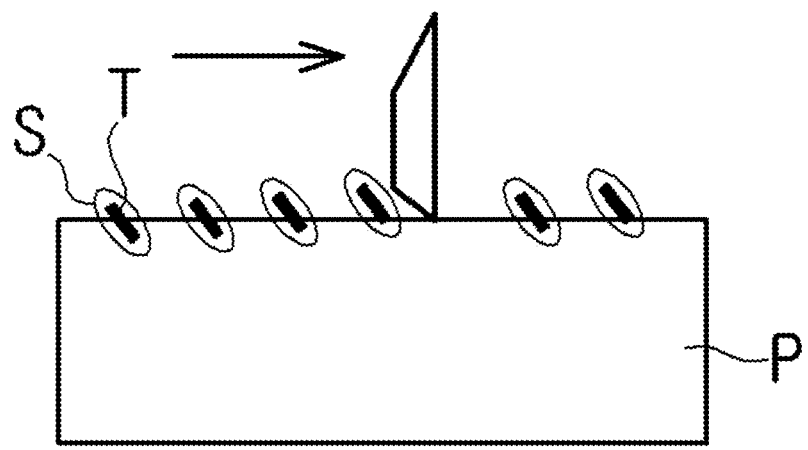
FIG. 1 is a view of a polyolefin composite material according to an embodiment illustrating scratch resistance.

Reference will now be made in detail to the embodiments of the present disclosure, examples of which are illustrated in the accompanying drawings, wherein like reference numerals refer to like elements throughout. In the following description of the present disclosure, a detailed description of known functions and configurations incorporated herein will be omitted when it may make the subject matter of the present disclosure rather unclear.

Also, it is to be understood that the terms "include" or "have" are intended to indicate the existence of elements disclosed in the specification, and are not intended to preclude the possibility that one or more other elements may exist or may be added.

It will be understood that, although the terms "first", "second", and the like, may be used herein to distinguish one element from another, and therefore, the components are not limited by the terms.

An expression used in the singular encompasses the expression of the plural, unless it has a clearly different meaning in the context.

The reference numerals used in operations are used for descriptive convenience and are not intended to describe the order of operations and the operations may be performed in a different order unless otherwise stated.

The present disclosure relates to a polyolefin master batch, more particularly, a polyolefin resin composition including a polyolefin resin, an inorganic filler, and a slip additive, a polyolefin master batch prepared using the same, a method of preparing the polyolefin master batch, and an article formed of the polyolefin master batch.

According to the present embodiment, the inorganic filler and the slip stabilizer are melt-extruded first before preparing a master batch, such that a probability of distributing the slip additive on the surface of the inorganic filler increases. By using the polyolefin master batch, automotive interior and exterior parts having excellent scratch resistance may be manufactured.

Hereinafter, principles and embodiments of the present disclosure will be described in more detail.

A polyolefin resin composition according to an embodiment includes a polyolefin resin, an inorganic filler, and a slip additive. The polyolefin resin composition is used to prepare a polyolefin master batch.

Hereinafter, the polyolefin resin is defined as an element constituting the polyolefin resin composition.

The polyolefin resin composition is defined as a resin composition to form the polyolefin master batch.

The polyolefin master batch refers to a master batch prepared by mixing an inorganic filler and a slip additive in higher concentrations than prescribed concentrations in a process of mixing the inorganic filler and the slip additive with a polyolefin resin and melt-extruding the mixture to prepare a polyolefin composite material.

A polyolefin composite material composition is defined as a composition including both the polyolefin master batch and a polyolefin resin.

A polyolefin resin composition generally includes an inorganic filler to improve mechanical properties of a polyolefin composite material. However, the inorganic filler has low binding force to a polyolefin matrix resulting in easy separation due to deformation and damage of the surface thereof. White particles of the inorganic filler separated therefrom and exposed to light stick out.

Thus, according to the present embodiment, the polyolefin master batch is prepared before preparing the polyolefin composite material composition, and a resin composition used to prepare the polyolefin master batch includes the inorganic filler and the slip additive. If the polyolefin master batch is prepared using the resin composition, the slip additive providing slip property is densely distributed on the surface of the inorganic filler. Thus, separation of the inorganic filler from the surface of the composite material due to deformation and damage of the surface of the composite material may be prevented.

Hereinafter, the polyolefin resin composition according to an embodiment will be described in more detail.

A polyolefin resin composition according to an embodiment includes 1 to 20 parts by weight of one polyolefin resin having a first melt index; 1 to 20 parts by weight of another polyolefin resin having a second melt index different from the first melt index; 60 to 85 parts by weight of an inorganic filler; and 5 to 20 parts by weight of a slip additive.

The polyolefin resins are added to the composite material to improve molding efficiency during molding of the composite material and impact resistance and chemical resistance of the composite material. Due to low specific gravity and low manufacturing costs, the polyolefin resin is applied to automotive interior and exterior parts in various ways.

The polyolefin resin may include at least one of a random copolymer resin prepared by polymerizing one monomer selected from the group consisting of propylene, ethylene, butylene, and octene, a block copolymer resin prepared by blending polypropylene with ethylene-propylene rubber, a copolymer resin of polyethylene, ethylene vinyl acetate, and a-olefin, and a homopolypropylene resin. However, types of the available polyolefin resin are not limited thereto.

The polyolefin resin composition according to the embodiment may include one polyolefin resin having a melt index of 0.5 to 10 g/10 min and another polyolefin resin having a melt index of 60 to 200 g/10 min. Each of the polyolefin resins may be added thereto in an amount of about 1 to about 20 parts by weight based on a total weight of the resin composition. If the amount of the polyolefin resin is less than 1 part by weight, extrusion molding processability of the master batch may decrease. If the amount of the polyolefin resin is greater than 10 parts by weight, the amounts of the inorganic filler and the slip additive are relatively low so that scratch resistance may decrease. Thus, the amounts of the polyolefin resins may be appropriately adjusted.

The inorganic filler is added to the polyolefin composite material to improve mechanical properties of the polyolefin composite material.

The inorganic filler may include at least one selected from the group consisting of talc, calcium carbonate, magnesium oxide, calcium stearate, wollastonite, mica, silica, calcium silicate, clay, and carbon black. Although types of the available inorganic filler are not limited thereto, inorganic fillers capable of considerably increasing rigidity and hardness of the polyolefin resin composition as an amount of the inorganic filler increases, such as talc and wollastonite, may be used therefor.

The inorganic filler may have an average particle diameter of 1 to 30 μm, preferably 5 to 10 μm. If the average particle diameter of the inorganic filler is less than 1 μm, the effect of reinforcing rigidity is not satisfactory. On the contrary, if the average particle diameter of the inorganic filler is greater than 30 µm, the polyolefin resin composition may not be easily handled nor processed during an extrusion molding process. Thus, the particle diameter of the inorganic filler may be appropriately adjusted to reinforce rigidity and improve extrusion molding efficiency.

The amount of the inorganic filler may be in the range of about 60 to about 85 parts by weight based on the total weight of the resin composition. If the amount of the inorganic filler is less than 60 parts by weight, the polyolefin composite material may not have sufficient rigidity. Thus, there may be a need to add another inorganic filler for preparation of the polyolefin composite material. Meanwhile, if the amount of the inorganic filler is greater than 85%, fluidity may decrease thereby reducing extrusion molding processability. Thus, the amount of the inorganic filler added to the resin composition may be appropriately adjusted.

The slip additive is used to improve scratch resistance of the polyolefin composite material. The slip additive included in the polyolefin resin composition according to the present embodiment in a high content together with the inorganic filler is melt-extruded with the inorganic filler, first. In this case, the slip additive is densely distributed around the inorganic filler included in the polyolefin master batch to improve scratch resistance of the polyolefin composite material.

FIG. 1 is a view of a polyolefin composite material according to an embodiment illustrating scratch resistance.

Referring to FIG. 1, a slip additive S is densely distributed around an inorganic filler T on the surface of a polyolefin composite material P according to an embodiment. Thus, since the slip additive S protects the inorganic filler T against a physical impact is applied to the surface of the polyolefin composite material P, the polyolefin composite material P has scratch resistance.

As the slip additive, a fluorine-acrylic copolymer-based compound may be used. More particularly, a fluorine-acrylic copolymer amide-based polymer compound having a number average molecular weight of 50,000 to 100,000 may be used to improve scratch resistance of the surface together with the polyolefin resin. In the fluorine-acrylic copolymer-based compound, a fatty amide component and a fluorine component have excellent surface slip property and an acrylic component has excellent surface resistance. Thus, the fluorine-acrylic copolymer-based compound is transited to the surface to block a scratch-causing factor. However, types of the available slip additive are not limited thereto and may also include modifications obvious to those of ordinary skill in the art.

The amount of the slip additive may be in the range of about 5 to about 20 parts by weight based on the total weight of the resin composition. If the amount of the slip additive is less than 5 parts by weight, scratch resistance may decrease due to a relatively lower amount than that of the inorganic filler. If the amount of the slip additive is greater than 20 parts by weight, an excess of the slip additive may cause difficulty in transition to the surface of the automotive parts. Thus, the amount of the slip additive may be appropriately adjusted.

Meanwhile, the polyolefin resin composition may further include at least one additive selected from the group consisting of an antioxidant, a UV stabilizer, a flame retardant, a colorant, a plasticizer, a thermal stabilizer, a slip agent, a compatibilizer, and an antistatic agent in addition to the aforementioned additives.

The polyolefin resin composition according to an embodiment has been described above. Hereinafter, a polyolefin master batch and a method of manufacturing the same according to an embodiment will be described.

A polyolefin master batch according to an embodiment is prepared by melt-extruding a polyolefin resin composition including 1 to 20 parts by weight of one polyolefin resin having a first melt index, 1 to 20 parts by weight of another polyolefin resin having a second melt index different from the first melt index, 60 to 85 parts by weight of an inorganic filler, and 5 to 20 parts by weight of a fluorine-acrylic copolymer-based compound.

Descriptions about the polyolefin resin composition used to prepare the polyolefin master batch described above will not be repeated herein.

The polyolefin master batch may be prepared by melt-extruding the polyolefin resin composition. The melt-extrusion may be performed using a single-screw extruder, a twin-screw extruder, a kneader, and the like at a screw-rotation speed of 100 to 500 rpm for 5 to 90 sec. In addition, a temperature for the melt-extrusion may be maintained at 180° C. to prevent deterioration of the polyolefin resin and the fluorine-acrylic copolymer amide-based polymer compound.

The present disclosure provides an article formed of a polyolefin composite material by using a polyolefin composite material composition including the polyolefin master batch prepared as described above. The polyolefin composite material may be applied to materials requiring scratch resistance in various application fields such as automotive interior and exterior parts. For example, the polyolefin composite material may be applied to bumpers, instrument panels, door trim panels, and interior trims requiring safety and superior functionality in vehicles. However, applications of the polyolefin composite material are not limited thereto.

Hereinafter, one or more embodiments of the present disclosure will be described in more detail with reference to the following examples and comparative examples based on results of evaluating physical properties of samples prepared by using polyolefin composite material compositions. However, these examples and comparative examples are not intended to limit the purpose and scope of the one or more embodiments of the present disclosure.

Polyolefin master batches were prepared using block polypropylene (BPP, MFR 60 g/10 min), talc (having an average particle diameter of 4 µm), and a fluorine-acrylic copolymer amide-based polymer compound by a 2-stage extruder system (Twin: Φ75, L/D: 42:1/Single: Φ180, and L/D: 9:1) according to Examples 1 to 4 and Comparative Examples 1 to 4 below.

Also, polyolefin composite materials were prepared using the aforementioned raw materials or the polyolefin master batches and high crystallinity polypropylene (HCPP, MFR 30 g/10 min) and polyolefin elastomer (POR, 6.7 g/10 min) by a 40 mm twin-screw extruder.

Example 1

A polyolefin master batch (M/B-A) was prepared by mixing BPP, talc, and the fluorine-acrylic copolymer amide-based polymer compound in a weight ratio of 5:85:10, and then a polyolefin composite material was prepared by mixing the master batch, HCPP, and POR in a weight ratio of 20:60:20. The polyolefin composite material was injection-molded to prepare a sample for physical property evaluations, and physical properties thereof were evaluated.

Example 2

Physical property evaluations were performed in the same manner as in Example 1, except that a polyolefin master batch (M/B-B) prepared by mixing BPP, talc, and the fluorine-acrylic copolymer amide-based polymer compound in a weight ratio of 10:80:10 was used.

Example 3

Physical property evaluations were performed in the same manner as in Example 1, except that a polyolefin master batch (M/B-C) prepared by mixing BPP, talc, and the fluorine-acrylic copolymer amide-based polymer compound in a weight ratio of 10:70:20 was used.

Example 4

Physical property evaluations were performed in the same manner as in Example 1, except that a polyolefin master batch (M/B-D) prepared by mixing BPP, talc, and the fluorine-acrylic copolymer amide-based polymer compound in a weight ratio of 10:80:10 was used.

Comparative Example 1

Physical property evaluations were performed in the same manner as in Example 1, except that the master batch was not prepared and a polyolefin composite material prepared by mixing BPP, talc, the fluorine-acrylic copolymer amide-based polymer compound, HCPP, and POR in a weight ratio of 1:17:2:60:20 that is the same composition ratio as that of the polyolefin composite material prepared according to Example 1 was extruded for comparison with Example 1.

Comparative Example 2

Physical property evaluations were performed in the same manner as in Example 2, except that the master batch was not prepared and a polyolefin composite material prepared by mixing BPP, talc, the fluorine-acrylic copolymer amide-based polymer compound, HCPP, and POR in a weight ratio of 2:16:2:60:20 that is the same composition ratio as that of the polyolefin composite material prepared according to Example 2 was extruded for comparison with Example 2.

Comparative Example 3

Physical property evaluations were performed in the same manner as in Example 3, except that the master batch was not prepared and a polyolefin composite material prepared by mixing BPP, talc, the fluorine-acrylic copolymer amide-based polymer compound, HCPP, and POR in a weight ratio of 2:14:4:60:20 that is the same composition ratio as that of the polyolefin composite material prepared according to Example 3 was extruded for comparison with Example 3.

Comparative Example 4

Physical property evaluations were performed in the same manner as in Example 4, except that the master batch was not prepared and a polyolefin composite material prepared by mixing BPP, talc, the fluorine-acrylic copolymer amide-based polymer compound, HCPP, and POR in a weight ratio of 4:12:4:60:20 that is the same composition ratio as that of the polyolefin composite material prepared according to Example 4 was extruded for comparison with Example 4.

The composition ratios of the polyolefin master batches prepared according to Examples 1 to 4 are shown in Table 1 below.

TABLE 1

|  | Example 1 (M/B-A) | Example 2 (M/B-B) | Example 3 (M/B-C) | Example 4 (M/B-D) |
|---|---|---|---|---|
| BPP (wt %) | 5 | 10 | 10 | 20 |
| Talc (wt %) | 85 | 80 | 70 | 60 |
| Fluorine-acrylic copolymer amide-based polymer compound (wt %) | 10 | 10 | 20 | 20 |

Composition Ratios

Composition ratios of the polyolefin composite material compositions prepared according to Examples 1 to 4 and Comparative Examples 1 to 4 are shown in Tables 2 and 3 below.

TABLE 2

|  | Example 1 | Example 2 | Example 3 | Example 4 |
|---|---|---|---|---|
| M/B-A | 20 | — | — | — |
| M/B-B | — | 20 | — | — |
| M/B-C | — | — | 20 | — |
| M/B-D | — | — | — | 20 |
| BPP | — | — | — | — |
| talc | — | — | — | — |
| Fluorine-acrylic copolymer amide-based polymer compound | — | — | — | — |
| HCPP | 60 | 60 | 60 | 60 |
| POR | 20 | 20 | 20 | 20 |
| TOTAL | 100 | 100 | 100 | 100 |

TABLE 3

|  | Comparative Example 1 | Comparative Example 2 | Comparative Example 3 | Comparative Example 4 |
|---|---|---|---|---|
| M/B-A | — | — | — | — |
| M/B-B | — | — | — | — |
| M/B-C | — | — | — | — |
| M/B-D | — | — | — | — |
| BPP | 1 | 2 | 2 | 4 |
| Talc | 17 | 16 | 14 | 12 |
| Fluorine-acrylic copolymer amide-based polymer compound | 2 | 2 | 4 | 4 |
| HCPP | 60 | 60 | 60 | 60 |
| POR | 20 | 20 | 20 | 20 |
| TOTAL | 100 | 100 | 100 | 100 |

Physical properties of samples prepared by using the polyolefin composite material compositions of Examples 1 to 4 and Comparative Examples 1 to 4 in the aforementioned composition ratios were measured according to the following methods.

Tensile strength was measured in accordance with ASTM D638D.

Flexural modulus was measured in accordance with ASTM D790.

Izod impact strength was measured in accordance with ASTM D256.

Scratch resistance (ΔL) was measured in accordance with the Erichsen method. A scratch tip having a diameter of 1 mm was used with a load of 10 N at a sliding speed of 1000 mm/min. Movement is 20×20.

The results of evaluating physical properties of the samples according to Examples 1 to 4 and Comparative Examples 1 to 4 are shown in Tables 4 and 5 below.

TABLE 4

|  | Example 1 | Example 2 | Example 3 | Example 4 |
|---|---|---|---|---|
| Density (g/cm$^2$) | 0.96 | 0.96 | 0.95 | 0.94 |
| Tensile strength (MPa) | 25 | 26 | 25 | 27 |
| Flexural modulus (MPa) | 2,360 | 2,250 | 2,270 | 2,220 |
| Izod impact strength J/m (@23° C.) | 220 | 230 | 225 | 235 |
| ΔL | 0.87 | 0.64 | 0.41 | 0.35 |

TABLE 5

|  | Comparative Example 1 | Comparative Example 2 | Comparative Example 3 | Comparative Example 4 |
|---|---|---|---|---|
| Density (g/cm$^2$) | 0.96 | 0.96 | 0.95 | 0.94 |
| Tensile strength (MPa) | 19 | 20 | 20 | 21 |
| Flexural modulus (MPa) | 2,150 | 2,100 | 2,130 | 1,980 |
| Izod impact strength J/m (@23° C.) | 170 | 175 | 165 | 175 |
| ΔL | 1.58 | 1.43 | 1.23 | 1.02 |

Referring to Tables 4 and 5, based on comparisons between Examples 1 to 4 in which the polyolefin master batches were used and Comparative Examples 1 to 4 in which the polyolefin master batches were not used, it was confirmed that the samples of Examples 1 to 4 had better mechanical properties, particularly, Izod impact strength and scratch resistance, than those of Comparative Examples 1 to 4. Thus, since dispersibility and slip properties of talc are improved by using the polyolefin master batches, it was confirmed that both mechanical properties and scratch resistance of the samples were improved.

Figure 2:
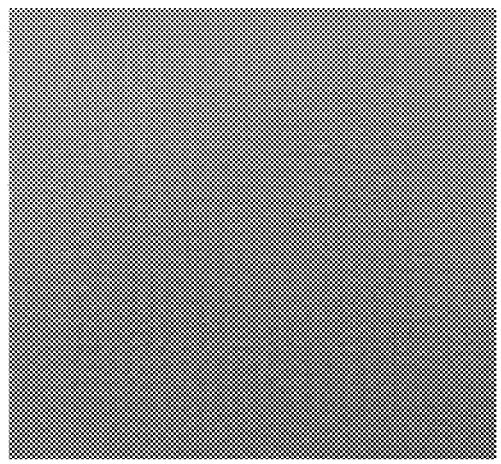
FIG. 2 is a photograph of scratched surfaces of the samples prepared using the polyolefin composite material compositions according to Example 1.
Figure 3:
FIG. 3 is a photograph of scratched surfaces of the samples prepared using the polyolefin composite material compositions according to Comparative Example 1.

FIGS. 2 and 3 are photographs of scratched surfaces of the samples prepared using the polyolefin composite material compositions according to Example 1 and Comparative Example 1.

Referring to FIGS. 2 and 3, it was confirmed that the sample prepared using the polyolefin composite material composition of Example 1 had better scratch resistance than that prepared using the polyolefin composite material composition of Comparative Example 1.

As is apparent from the above description, according to the polyolefin master batch prepared using the polyolefin resin composition and an article formed of the same according to an embodiment, a probability of distributing the slip additive on the surface of the inorganic filler relatively increases by preparing a master batch by melt-extruding the inorganic filler and the slip additive in high contents first. By using the polyolefin master batch, polyolefin composite materials having excellent scratch resistance may be prepared.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A polyolefin resin composition comprising a first polyolefin resin having a first melt index, a second polyolefin resin having a second melt index different from the first melt index, an inorganic filler, and a fluorine-acrylic copolymer, wherein:
   the first polyolefin resin has a weight percent of 1 to 20 percent by total weight of the polyolefin resin composition;
   the second polyolefin resin has a weight percent of 1 to 20 percent by total weight of the polyolefin resin composition;
   the inorganic filler has 60 to 85 percent by total weight of the polyolefin resin composition; and
   the fluorine-acrylic copolymer has 5 to 20 percent by total weight of the polyolefin resin composition.

2. The polyolefin resin composition of claim 1, wherein the first melt index is from 0.5 to 10 g/10 min, and the second melt index is from 60 to 200 g/10 min.

3. The polyolefin resin composition of claim 1, wherein the first polyolefin resin and the second polyolefin resin comprise a random copolymer resin prepared by polymerizing one monomer selected from the group consisting of propylene, ethylene, butylene, and octene.

4. The polyolefin resin composition of claim 1, wherein the first polyolefin resin and the second polyolefin resin comprise a block copolymer resin prepared by blending polypropylene with ethylene-propylene rubber.

5. The polyolefin resin composition of claim 1, wherein the polyolefin resin comprises a copolymer resin prepared by polymerizing at least one monomer selected from the group consisting of ethylene, ethylene vinyl acetate, and a-olefin.

6. The polyolefin resin composition of claim 1, wherein the inorganic filler comprises an inorganic filler selected from the group consisting of talc, calcium carbonate, magnesium oxide, calcium stearate, wollastonite, mica, silica, calcium silicate, clay, and carbon black.

7. The polyolefin resin composition of claim 1, wherein the fluorine-acrylic copolymer has a number average molecular weight of 50,000 to 100,000.

8. The polyolefin resin composition of claim 1, further comprising an additive selected from the group consisting of an antioxidant, a UV stabilizer, a flame retardant, a colorant, a plasticizer, a thermal stabilizer, a slip agent, a compatibilizer, and an antistatic agent.

9. The polyolefin resin composition of claim 8, further comprising an second additive that is different from the additive, the second additive selected from the group consisting of an antioxidant, a UV stabilizer, a flame retardant, a colorant, a plasticizer, a thermal stabilizer, a slip agent, a compatibilizer, and an antistatic agent.

10. A polyolefin master batch prepared by melt-extruding a polyolefin resin composition, the polyolefin resin composition comprising a first polyolefin resin having a first melt index, a second polyolefin resin having a second melt index different from the first melt index, an inorganic filler, and a fluorine-acrylic copolymer, wherein the first polyolefin resin has a weight percent of 1 to 20 percent by total weight of the polyolefin resin composition, the second polyolefin resin has a weight percent of 1 to 20 percent by total weight of the polyolefin resin composition, the inorganic filler has 60 to 85 percent by total weight of the polyolefin resin composition, and the fluorine-acrylic copolymer has 5 to 20 percent by total weight of the polyolefin resin composition.

11. The polyolefin master batch of claim 10, wherein the first melt index is from 0.5 to 10 g/10 min, and the second melt index is from 60 to 200 g/10 min.

12. A method of preparing the polyolefin master batch of claim 10, the method comprising melt-extruding the polyolefin resin composition.

13. The method of claim 12, wherein the first melt index is from 0.5 to 10 g/10 min, and the second melt index is from 60 to 200 g/10 min.

14. The method of claim 12, further comprising mixing the polyolefin resin composition with an additive selected from the group consisting of an antioxidant, a UV stabilizer, a flame retardant, a colorant, a plasticizer, a thermal stabilizer, a slip agent, a compatibilizer, and an antistatic agent.

15. An article formed of a polyolefin composite material composition comprising:
a polyolefin master batch formed of a polyolefin resin composition, the polyolefin resin composition comprising a first polyolefin resin having a first melt index, a second polyolefin resin having a second melt index different from the first melt index, an inorganic filler, and a fluorine-acrylic copolymer, wherein the first polyolefin resin has a weight percent of 1 to 20 percent by total weight of the polyolefin resin composition, the second polyolefin resin has a weight percent of 1 to 20 percent by total weight of the polyolefin resin composition, the inorganic filler has 60 to 85 percent by total weight of the polyolefin resin composition, and the fluorine-acrylic copolymer has 5 to 20 percent by total weight of the polyolefin resin composition.

16. The article of claim 15, wherein the article comprises an automotive part having scratch resistance.

17. The article of claim 15, wherein the first melt index is from 0.5 to 10 g/10 min, and the second melt index is from 60 to 200 g/10 min.

18. The polyolefin resin composition of claim 5, wherein the polyolefin resin composition further comprises a homopolypropylene resin.

* * * * *